United States Patent [19]

Weissman et al.

[11] Patent Number: 5,275,994
[45] Date of Patent: Jan. 4, 1994

[54] PROCESS FOR PREPARING A CATALYST FOR REMOVAL OF HYDROPROCESSING IMPURITIES

[75] Inventors: Jeffrey G. Weissman, Wappingers Falls; Gerald G. Sandford, Glenham; Max R. Cesar, Newburgh, all of N.Y.

[73] Assignee: Texaco Inc., White Plains, N.Y.

[21] Appl. No.: 716,482

[22] Filed: Jun. 17, 1991

[51] Int. Cl.⁵ .............................................. B01J 31/00
[52] U.S. Cl. ...................... 502/171; 502/311; 502/312; 208/216 R; 208/216 PP; 208/254 H; 210/757
[58] Field of Search ............... 210/757; 208/216; 502/311, 312, 171

[56] References Cited

U.S. PATENT DOCUMENTS

| | | | |
|---|---|---|---|
| 3,714,031 | 1/1973 | van der Tooru et al. | 208/216 R |
| 4,152,250 | 5/1979 | Inooka et al. | 208/216 R |
| 4,166,026 | 8/1979 | Fukui et al. | 208/216 PP |
| 4,326,995 | 4/1982 | Berg et al. | 208/216 PP |
| 4,578,179 | 3/1986 | Kukes et al. | 208/216 R |
| 4,581,129 | 4/1986 | Miller et al. | 208/216 R |
| 4,828,683 | 5/1989 | Gardner et al. | 208/316 R |
| 4,888,316 | 12/1989 | Gardner et al. | 208/216 R |
| 4,975,399 | 12/1990 | Gardner | 208/216 R |

*Primary Examiner*—David Brunsman
*Attorney, Agent, or Firm*—James J. O'Loughlin; Vincent A. Mallare

[57] ABSTRACT

A process of preparing a catalyst for removal of sulfur and nitrogen in hydro-processing of hydrocarbon streams. The catalyst composition is formed by depositing molybdenum or tungsten. A second metal is deposited on the support layer in a non-aqueous fashion. The second metal being vandium, niobium or tantalum in organic solvent soluble metal alkoxide form. A third metal of nickel or cobalt is deposited and calcined on the support layer.

3 Claims, No Drawings

PROCESS FOR PREPARING A CATALYST FOR REMOVAL OF HYDROPROCESSING IMPURITIES

BACKGROUND OF THE INVENTION

This invention relates to a catalyst composition useful in the removal of sulfur and nitrogen from gas oils, as practiced in the hydrocarbon refining industry, in a process commonly referred to as hydroprocessing.

A solid catalyst, such as the material of concern of the present invention, is contained inside of a reactor in which the material to be hydroprocessed is passed over the catalyst together with a flow of hydrogen, at comparatively moderate temperatures and pressures and flow rates. In customary practice, the catalyst consists of metal oxides on a support, the oxides being converted to sulfides to produce an active, stable catalyst prior to use. The product is a gas oil in which the sulfur and nitrogen content has been substantially reduced. Any improvement in this process, especially as relating to the use of a material having improved activity for catalyzing this reaction, will result in significant economic savings.

Catalytic hydroprocessing, as currently practiced, uses a material consisting of active metals, either molybdenum or tungsten and either nickel or cobalt, possibly with promoters, on an inert support consisting of alumina or silica or mixtures of these. The use of different supports or other supported metals has been found to either enhance or decrease the activity of the base catalyst. Also, varying the method of preparation of these materials can also result in a change in catalytic activity.

Hydroprocessing catalysts have been traditionally prepared by depositing aqueous solutions of molybdenum, tungsten, nickel and cobalt salts onto a support; either in separate steps or by co-deposition. Alternately, the support and the deposited metals can be formed simultaneously. Intermediate and final calcining steps are necessary to produce the final form of the catalyst, an alumina support holding more-or-less dispersed molybdenum, tungsten, nickel and cobalt oxides. Numerous variations in both methods and compositions of this procedure have been described.

Improvements in these materials can be effected. One such method through the addition of other elements, specifically those designed to interact with the support or catalytically active metals. By doing so the utilization of active metals can be increased without necessarily adversely affecting support properties and without the need for increasing the content of active metals. Hence a small increase in the cost of the catalyst, as necessitated by the additional components, can result in significant savings by permitting operation of the hydroprocessing process at less severe conditions or at higher throughput.

Therefore, it is an object of the present invention to a material, suitable for use as a hydroprocessing catalyst, containing molybdenum, tungsten, nickel and cobalt on a support, and containing a third metal.

Another object of the present invention to provide a material in which the third metal is an metal alkoxide deposited in an essentially water-free environment, while the other metals are deposited in aqueous solutions.

A further object of the present invention to provide a material in which the third metal is selected from a group consisting of vanadium, niobium, or tantalum, or combinations of these three.

Moreover, another object of the present invention to provide a process for the removal of sulfur and nitrogen from hydrocarbon streams, employing a material of this disclosure as an improved hydroprocessing catalyst.

SUMMARY OF THE INVENTION

The present invention provides a process for removing sulfur and nitrogen from hydrocarbon streams which include gas oils, diesel fuels and other streams boiling between 200° F. and 1000° F. The process comprises passing in combination the hydrocarbon streams and a gas containing at last 80% $H_2$ over a catalyst at from 100° to 500° C. and from 100 to 2500 psi, whereby sulfur and nitrogen are removed from the hydrocarbon streams. The catalyst utilized in the process may have a composition consisting of from 0.5 to 40 wt % of either Mo or W or both Mo and W, from 0.5 to 20 wt % of either Co or Ni or both Co and Ni, and from 0.1 to 10 wt % of V, Nb or Ta or combinations thereof.

DETAILED DESCRIPTION OF THE INVENTION

Materials, e.g., catalyst composition, prepared according to the processes herein have been found to be active for the catalytic removal of sulfur and nitrogen from hydrocarbon refinery streams while having minimal hydrocracking activity.

According to the present invention, it has been found that by adding a metal alkoxide to a hydroprocessing catalyst containing two active metals supported on alumina, a significant and surprising increase in the overall sulfur and nitrogen removal activities is found, as compared to a material not containing a metal alkoxide. This is surprising as G. Muralidhar, F. E. Massoth, and J. Shabtai, in *Journal of Catalysis*, volume 85, pp. 44–52, 1984, found that the addition titanium isopropoxide, $Ti[OCH(CH_3)_2]_4$, to a typical cobalt and molybdenum oxides supported on alumina catalyst resulted in a significant decrease in sulfur removal activity as compared to an ordinary Co-Mo catalyst. In addition, they found that the degree of hydrocracking of the feed, a undesirable side reaction, was strongly increased. In the processes of the current invention, no significant hydrocracking was observed.

The exact nature of the support is unimportant, as long as the support material is moderately reactive with metal alkoxides, as will be described below. While the deposition of molybdenum, tungsten, cobalt and nickel onto the support can be by any convenient manner, We have found that the addition of a third metal in the form of an alkoxide, deposited in an essentially water-free environment, is necessary for the preparation of materials of this disclosure.

The support composition to be utilized in preparing a material according to the process of the present invention should be a non-zeolitic refractory inorganic oxide or a zeolitic or molecular sieve type material, and should have particle sizes between 300 microns and 0.25 inches, i.e. not a fluidizable material and not a monolithic material. The support should contain micropores, with an average pore radius of monomodal functionality from between 20 Å and 1000 Å, preferably between 20 and 250 Å; and should have a surface area from between 50 and 500 m²/g, preferably greater than 200 m²/g. In addition, the support should have a pore volume of from 0.1 to 2.0 ml/g, preferably at least 0.5 ml/g.

The support composition should be of a material that is resistant to chemical and physical modifications that may result from exposure to the processes of this disclosure or from exposure to conditions occurring in the use of this material, as in during a hydroprocessing reaction. In addition, the support should be relatively inert to catalyzing reactions during hydroprocessing. In addition, the support should contain a sufficient concentration of hydroxyl groups (OH) on its surface to provide for the stabilization of metal alkoxides placed onto the support; such surface hydroxyl concentrations can range from 0.1 to 20 surface OH groups per $nm^2$, preferable from 1 to 10 surface OH groups per $nm^2$.

Support materials meeting these criteria include, but are not limited to: amorphous silica; gamma, eta, beta, delta, or alpha alumina; mixtures of $SiO_2$'s and $Al_2O_3$'s; rutile, anatase, brookite, or mixtures of these; amorphous or crystalline zirconia, or molecular sieves of various types. Materials that are not fully oxidized, such as various carbons or aluminum hydroxides such as boehmite, are not suitable supports, as they may undergo undesirable transformations when exposed to the processes of this invention. Preferred support materials are $SiO_2$ or $Al_2O_3$ or mixtures of these, each of which is available commercially; more preferred is gamma-$Al_2O_3$. The support can consist of either powders, pellets, or shaped extrudites, as long as the final form meets the criteria listed above. Also, the support should be relatively free from other elements, such as phosphorus, boron, alkali metals, alkaline metals, and other elements not specified.

Three groups of metals are to be deposited onto the support: 1) molybdenum or tungsten or both, 2) vanadium, niobium, and tantalum, or combinations of these, 3) nickel or cobalt or both. Each group of elements is deposited in a separate step; or alternately, the first and last group can be deposited together. Several schemes can be used to deposit these metals onto the support, these steps will be fully described:

I.
  1. deposit V, Nb, Ta or combinations
  2. deposit Mo or W or both
  3. deposit Ni or Co or both II.
  1. deposit V, Nb, Ta or combinations
  2. co-deposit Mo or W or with both Ni or Co or both III.
  1. deposit Mo or W or both
  2. deposit Ni or Co or both
  3. deposit V, Nb, Ta or combinations IV.
  1. co-deposit Mo or W or both with Ni or Co or both
  2. deposit V, Nb, Ta or combinations V.
  1. deposit Mo or W or both
  2. deposit V, Nb, Ta or combinations
  3. deposit Ni or Co or both After each deposition step, a calcining step, as described below, may be undertaken. The calcining step is required after deposition of Mo, W, Ni, or Co, but can be optional after deposition of V, Nb, or Ta. No advantage is seen of one of these schemes over the others, all five are preferred. However, deposition of Ni or Co first, followed by calcining, is not preferred; also, calcining is required after the final deposition step. Each preparation step will be described separately, and can be performed in the order according to schemes I through V.

Deposition of molybdenum or tungsten or both, is performed using a suitable water soluble compound of Mo or W. Preferred compounds are $(NH_4)_6Mo_7O_{24}\cdot 4H_2O$ and $(NH_4)_2WO_4$ or other ammonium salts of various water content. The Mo or W compounds are dissolved in sufficient water to effect complete solution. This solution is placed onto the support by the incipient wetness technique, in which enough liquid is used to fully saturate all of the pores of the support, but with no excess liquid remaining outside of the support. If the volume of liquid required to dissolve all of the Mo or W compound is greater than the pore volume of the support, then the solution can be added in batches, with intermediate drying steps between each batch. Such drying steps involve heating the support up to, but not above, 110° C. for sufficient time to remove all of the water contained in the support, either at atmospheric pressures or in vacuum.

Deposition of nickel or cobalt or both, is performed using the same procedure as described above for Mo or W. Suitable Ni or Co compounds include any compounds easily soluble in water, such as nitrates, sulfates, or halides. $Ni(NO_3)_2\cdot 6H_2O$ and $Co(NO_3)_2\cdot 6H_2O$ are preferred.

Deposition of V, Nb, or Ta, is performed using an alkoxide compound soluble in alcohol or paraffinic solvents, such as ethanol, methanol, hexanes, or heptanes. The metal alkoxides have general formula $M(OR)_n$, where M is the metal and R is an alkyl group of general formula $C_iH_{2i+1}$, with i usually having values of 1, 2, 3 or 4, or a phenoxy group of general formula $C_{6+i}H_{5+2i}$, with i usually having values of 0, 1, 2, 3 or 4, and n is the valance of the metal, up to n different R groups can occur in each compound. Values of n can range from 1 to 5, n being 5 for V, Nb, Ta. An alternative formula in the case of V may be $VO(OR)_3$, with R as before. Metal alkoxides are characterized by having metal to oxygen to carbon bonds, as opposed to direct metal to carbon bonds occurring in alkyl metal compounds. These metal alkoxides are usually liquids, although solid metal alkoxides can also be employed. Their use is advantageous in that they can be obtained in high purity, avoiding contaminants that are potentially harmful, are convenient to use, and are readily decomposed to the metal oxide. Compounds useful in preparing materials of this disclosure include, but are not limited to:

| | |
|---|---|
| vanadium tri-isopropoxide oxide | $VO(OC_3H_7)_3$ |
| niobium ethoxide | $Nb(OC_2H_5)_5$ |
| niobium phenoxide | $Nb(OC_6H_5)_5$ |
| tantalum ethoxide | $Ta(OC_2H_5)_5$ |
| tantalum methoxide | $Ta(OCH_3)_5$ |

Of these metal alkoxide compounds, all of which are presently available commercially, Nb and Ta ethoxides and vanadium tri-isopropoxide oxide are preferred.

Working in a water-free environment, such as in a inert-gas purged container, the metal alkoxide is mixed with a solvent to produce a sufficient volume of solution to fill the pores of the support. Prior to use, the support can be dried to remove free and adsorbed water. Such drying can involve heating at temperatures not greater than about 110° C. or exposure to vacuum or both, for a sufficient period of time to effect removal of all water. The support is then mixed with the solution containing the metal alkoxide. At no point during these steps should water or water vapor be allowed to contact any of the components. After all of the solution is placed onto the support by using the incipient wetness deposition method, the saturated support can now be exposed to normal atmospheric conditions. The alkoxide containing material is dried as described to remove excess solvent.

An alternative method of contacting the support with the metal alkoxide involves employing the technique of equilibrium adsorption, again performed in an inert atmosphere. In this method the metal alkoxides are mixed with a quantity of solvent, which is then mixed with the dried support. The solvent is a non-aqueous water free alcohol or paraffinic liquid, such as ethanol, methanal, hexanes, or heptanes. Sufficient solvent is used so that the mixture can be agitated while keeping the support completely immersed in the solvent. Typically, total volume of the solvent used is two to four times the bulk volume of the support. The support and solution is allowed to mix for enough time to reach equilibrium, at which point an equilibrium amount of the metal alkoxide is adsorbed or reacted with the support. The excess solvent and metal alkoxide, if any, is then filtered from the support, and the alkoxide material is exposed to normal atmospheric conditions and dried to remove excess solvent.

After deposition of the metal alkoxide the material can be calcined to fully oxidize the metal, also calcining is necessary after deposition of Ni, Co, Mo, or W to decompose the metal compounds and convert the metals to the corresponding oxides. Calcining involved flowing oxygen or air or an oxygen containing inert gas over the material at a rate sufficient to remove reaction products arising from the decomposition of the metal oxide precursor compounds. Such calcining can be done at from 300° C. to 1000° C. for up to 48 hours, preferably at from 400° C. to 600° C. from between 1 and 6 hours. Alternatively, for the case of calcining after deposition of V, Nb, or Ta, the calcining can be done at from 100° C. to 1000° C. for up to 48 hours, preferably at from 200° C. to 600° C. from between 1 and 6 hours, and more preferably from 300° C. to 600° C. from between 1 and 6 hours.

The composition of a catalyst prepared by any of the schemes described above can range from 0.5 to 40 wt % of either Mo or W or both Mo and W, measured as metal content but occurring as an oxide, from 0.5 to 20 wt % of either Co or Ni or both Co and Ni, measured as metal content but occurring as an oxide, and from 0.1 to 10 wt % of V, Nb, or Ta or combinations, measured as metal content but occurring as an oxide. A more preferred composition may be from 5 to 20 wt % Mo or W, from 1.5 to 4 wt % Ni or Co, and from 0.5 to 4 wt % of V, Nb, or Ta or combinations, measured as metal content but occurring as the oxides. Of V, Nb, and Ta, Nb is more preferred. The balance of the weight in all of these cases consists of the support material.

The quantities of metals deposited onto a support of high surface area, 200 to 350 m$^2$/g, are such that the support is not fully covered by any one metal. That is, none of the metals, Mo, W, V, Nb, Ta, Ni or Co, are present in sufficient quantities to form a monolayer on the support. However, the metals may occur as multilayer aggregates covering a small portion of the support. Regardless of which scheme is followed, all metals have an opportunity to be directly contacted with the support, allowing the metal alkoxide to react with the surface hydroxyl groups of the support. Surface concentrations of the metals can be measured by X-ray photoelectron spectroscopy (XPS), as described in "An Introduction to Chemisorption and Catalysis by Metals," by R. P. H. Gasser, pp. 143–146, Oxford University Press, 1985. Different methods are used to measure surface concentration, for the purposes of this disclosure surface concentration of a metal will be defined as the fraction of that metal compared to all the metals present, disregarding contributions from oxygen, carbon, and impurities. Thus the sum of the concentrations of each metal should add to unity. Although not a requirement of this disclosure, the surface concentrations of the metals employed in this disclosure are preferably in the range of 0.05 to 0.20 for Mo and W, 0.01 to 0.10 for V, Nb, and Ta, and 0.02 to 0.10 for Ni or Co, with the balance being the support metal(s). Surface coverage greater than these preferred ranges have been found to result is less active catalysts.

After the final calcining step, this material is then treated so that the active metals are sulfided. This can involve several procedures. One method is to load the material into a hydroprocessing reactor, followed by contacting with sulfur containing compounds. Such contacting can be by $H_2S$ mixed with $H_2$ in concentrations ranging from 0.5 to 20 wt % and under conditions ranging from 250° to 500° C. and from 0 to 1000 psig, under a continuous flow at rates from 1 to 50 SCCM of gas per ml of catalyst and from 0.5 to 10 hrs. Alternatively, the catalyst can be contacted with a non-aqueous solution of a reactive sulfur containing compound, such as thiols, sulfides and disulfides, including compounds such as propanethiol, butyl disulfide, or other suitable compounds. Solvents can include refinery hydrocarbon streams such as gas-oils, paraffinic liquids such as hexanes, or other suitable non-aqueous solvents. The solution, containing at least enough sulfur to stoichiometrically sulfide the catalyst is contacted with the material to be sulfided by completing filling the catalyst bed with the liquid under conditions ranging from 20 to 110° C. and from 0 to 1000 psig and from no flow to 10.0 LHSV and from 0.5 to 10 hrs. Alternatively, the liquid solution can be contacted with the material to be sulfided outside of the hydroprocessing reactor, in any suitable equipment. The sulfided catalyst is then dried in an oxygen-free environment and placed into the hydroprocessing reactor.

After the sulfiding procedure is complete, the material can be used as a catalyst for hydroprocessing of refinery hydrocarbon streams, such as light cycle gas oils, heavy cycle gas oils, napthenates, vacuum gas oils, or any other refinery streams used in a typical hydroprocessing reaction. The use and operation of hydroprocessing reactions is well known and carried on extensively in practical operation. Typical operating conditions for the catalyst of this invention may range, but are not limited to, from 200° to 600° C., from 0 to 2500 psig, from 0.2 to 10 liquid LHSV of the hydrocarbon stream to be hydroprocessed, and from 1. to 20. SCCM of gas per cc of liquid, the gas consisting of recycle and containing at least 60% $H_2$.

Although this disclosure is not intended :o present theories on the mechanisms of reactions occurring in the processes herein, a brief discussion will clarify the function and necessity of using metal alkoxides. Metal alkoxides are well known to undergo rapid hydrolysis upon exposure to air, or exchange reactions when contacted with electrophilic groups, such as surface hydroxyls on the preferred supports. In such as reaction, a OR group from a metal alkoxide is replace by a surface OH group on the support, thus creating a direct support-oxygen-metal bond, for example, according to: Al—OH+M(OR)$_n$→Al—O—M—(OR)$_{n-1}$+ROH. In addition, the metal alkoxide, after exposure to water or water vapor, either at normal temperatures or higher, i.e. calcining, is decomposed to the metal oxide, when supported this results in a direct support-metal oxide bond, according to: Al—O—M—(OR)$_{n-1}$+(n−1)/2·H$_2$O→Al—O—MO$_{(n-1)}$/2 +(n−1)ROH. It is believed that this structure results in a greater dispersion of the active metals, Ni, Co, Mo, and W, through reduction of active metal-support interactions, and may also contribute additional active sites, thus increasing the overall activity of the catalyst without increasing the quantity of active metals required.

The preparation and use of materials of this invention are further described by the following Examples as well as the advantages thereof.

EXAMPLE 1

The preparation of a material according to this invention is described, employing scheme V. 250 g. of gamma-alumina, consisting of particles between 420 and 840 microns, having a surface area of about 260 m$^2$/g, a pore volume of 0.7 ml/g and average pore radius of 96 Å was dried at 110° C. A solution of 177 ml of deionized water and 45.46 g of (NH$_4$)$_6$Mo$_7$O$_{24}$.4H$_2$O was added to the alumina via the incipient wetness technique. This was dried at 110° C. under vacuum and then was calcined in air at 500° C. for 3 hours. To 40 g of this product was added a solution of 7 ml niobium ethoxide and 22 ml of hexanes by incipient wetness, under nitrogen. This material was dried by exposure to atmosphere, then calcined at 500° C. for 3 hours. Onto this product was added a solution of 7.13 g Ni(NO$_3$)$_2$.6H$_2$O and 28.3 ml water by incipient wetness, dried at 110° C. under vacuum and then calcined at 500° C. for three hours.

EXAMPLE 2

The description of a procedure used to test the materials of this invention as hydroprocessing catalysts is described. 50 ml of the material to be tested is placed inside of a stainless steel tube reactor. The material is sulfided in a 10 wt % mixture of H$_2$S in H$_2$ at a rate of 450 SCCM at 300° C. and at atmospheric pressure. After completion of sulfiding, hydroprocessing is commenced under the following conditions: gas flow is switched to pure H$_2$ at 450 SCCM, and a liquid flow of 100 ml/hr, corresponding to 2 liquid-hourly space velocity, started, with the overall reactor pressure being held at 400 psi and operated at 300° C. The liquid feed is representative of the type treatable by the catalysts of this invention, consisting of a light straight-run gas oil (LSRGO) having the properties listed below in Table 1. After operating in this mode for a minimum of 24 hours, liquid products are removed for analysis for sulfur and nitrogen content by X-ray fluorescence and chemiluminescence, respectively. Note that the hydroprocessing conditions selected allow for only partial hydrodesulfurization and hydrodenitrogenation of the feed; these conditions facilitate comparisons between different materials.

TABLE 1

| Properties of LSRGO | |
|---|---|
| Gravity | 35.9° |
| IBP | 478° F. |

TABLE 1-continued

| Properties of LSRGO | |
|---|---|
| 10% | 503° F. |
| 50% | 536° F. |
| 90% | 592° F. |
| FBP | 648° F. |
| S, wt % | 1.37 |
| N, ppm | 83. |

EXAMPLE 3

The preparation of a material not according to the processes of this invention is described, for the purposes of showing improvements in the art that this invention allows. Similar to scheme III, but with step 3 omitted, and using the same preparation procedures and gamma-Al$_2$O$_3$ support as described in Example 1, 7.28 g of (NH$_4$)$_6$Mo$_7$O$_{24}$.6H$_2$O, and 8.00 g of Ni(NO$_3$)$_2$.6H$_2$O was placed onto 40 g Al$_2$O$_3$. After each deposition, the product was calcined at 500° C. for three hours.

EXAMPLE 4

The materials prepared in Examples 1 and 3 were tested as catalysts according to the procedure of example 2, results of which are presented below in Table 2. The materials of Example 1 and 3 were placed in the reactor system according to Example 2, in separate runs. These results clearly illustrate the advantages the material of this invention has for the catalytic removal of sulfur and nitrogen from gas oils, as compared to a material prepared in the absence of a metal alkoxide.

TABLE 2

| Comparison of Materials From Examples 1 and 3 | | | | | |
|---|---|---|---|---|---|
| | g/100 g Al$_2$O$_3$ | | | Conversion | |
| Ex. | Mo | Ni | Nb | S | N |
| 1 | 9.9 | 4.1 | 7.8 | 68 | 22 |
| 3 | 9.9 | 4.0 | 0 | 60 | 14 |

EXAMPLE 5

This Example illustrates an alternative embodiment of a material prepared according to the processes of this invention, and the applicability of using this material as a catalyst for the removal of sulfur and nitrogen from gas oils. Using the same preparation methods, preparation scheme, and alumina as in Example 1, 45.46 g (NH$_4$)$_6$Mo$_7$O$_{24}$.6H$_2$O mixed with 177 ml of water was placed onto 250 g Al$_2$O$_3$ and calcined. Onto 29 g of this product, 6 ml of vanadium tri-isopropoxide oxide mixed with 14.5 ml of methanol were placed and the product dried at 110° C. in vacuum. Onto this product 3.14 g of Ni(NO$_3$)$_2$.6H$_2$O mixed with 20.5 ml of water were added. This product was tested according to the procedure of Example 2. The liquid product of this test was found to have a 46% reduction in sulfur and 7% reduction in nitrogen content.

EXAMPLE 6

This Example illustrates an alternative embodiment of a material prepared according to the processes of this invention, and the applicability of using this material as a catalyst for the removal of sulfur and nitrogen from gas oils. Using the same deposition procedures and alumina support of Example 1, and employing deposition scheme I, 7.0 ml of niobium ethoxide was placed onto 40 g of Al$_2$O$_3$, then calcined at 500° C. for 3 hours.

7.28 g of $(NH_4)_6Mo_7O_{24}\cdot 6H_2O$ and 7.17 g of $Ni(NO_3)_2\cdot 6H_2O$ was placed onto this product in separate steps, with calcining at 500° C. for 3 hours after each step. This product was placed into a reactor and tested as described in Example 2. The liquid product of this test was found to have a 61% reduction in sulfur and an 18% reduction in nitrogen content.

EXAMPLE 7

This Example illustrates an alternative embodiment of a material prepared according to the processes of this invention, and the applicability of using this material as a catalyst for the removal of sulfur and nitrogen from gas oils. Using the same deposition procedures and alumina support of Example 1, and employing deposition scheme I, 7.0 ml of niobium ethoxide mixed with 25 ml of hexanes was placed onto 40 g of $Al_2O_3$, then dried at 110° C. in vacuum. 7.28 g of $(NH_4)_6Mo_7O_{24}\cdot 6H_2O$ mixed with 28.3 ml of water and 7.17 g of $Ni(NO_3)_2\cdot 6H_2O$ mixed with 28.3 ml of water were placed onto this product in separate steps, with calcining at 500° C. for 3 hours after each step. This product was placed into a reactor and tested as described in Example 2. The liquid product of this test was found to have a 67% reduction in sulfur and an 26% reduction in nitrogen content.

EXAMPLE 8

This example illustrates an alternative embodiment of a material prepared according to the processes of this invention, and the applicability of this material as a catalyst for the removal of sulfur and nitrogen from gas oils. Employing deposition scheme I, 25 g of the alumina support described in Example 9 ml of vanadium tri-isopropoxide oxide, and 100 ml of ethanol were mixed in a flask for several hours, using the equilibrium adsorption technique. This product was filtered from the liquid and washed several times with methanol, and then dried under vacuum at 110° C. for 3 hours, and was not calcined. Onto this product, 4.58 g of $(NH_4)_6Mo_7O_{24}\cdot 6H_2O$ and 3.14 of $Ni(NO_3)_2\cdot 6H_2O$ were deposited in separate steps by the incipient wetness technique, with calcining at 500° C. for 3 hours after each step. This product was placed into a reactor and tested as described in Example 2. The liquid product of this test was found to have a 48% reduction in sulfur and an 12% reduction in nitrogen content, illustrating that a material made according to the processes of this invention, in which a metal alkoxide is deposited by equilibrium adsorption, is useful as a catalyst for hydroprocessing of gas oils.

We claim:

1. A process for preparing a catalyst comprising:
   (a) depositing a first metal of molybdenum or tungsten or both metals onto a support layer;
   (b) optionally, calcining the first metal on said support layer;
   (c) depositing a second metal selected from the group consisting of vanadium, niobium and tantalum, said second metal being introduced via organic solvent soluble metal alkoxides of the formula $M(OR)_5$ where M is V, Nb or Ta, and R is a hydrocarbon radical of the formula $C_nH_{2n+1}$, where n is an integer of the value of 1 to 4;
   (d) optionally, calcining the second metal on said support layer; and
   (e) depositing a third metal of nickel or cobalt or both metals onto said support layer, and calcining said third metal on said support layer, whereby the catalyst is provided to remove sulfur and nitrogen from said hydrocarbon streams.

2. The process of claim 1 wherein said metal alkoxide has the formula of $VO(OC_3H_7)_3$, $Nb(OC_2H_5)_5$, or $Ta(OC_2H_5)_5$.

3. The process of claim 1 wherein the deposition step is undertaken in essentially an anhydrous environment.

* * * * *